(No Model.)
A. C. ARNESON.
MECHANICAL MOVEMENT.
No. 360,194. Patented Mar. 29, 1887.
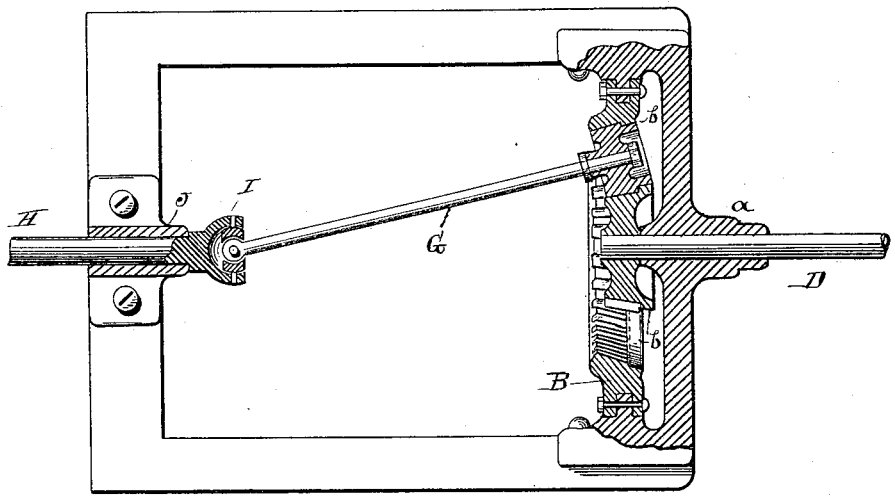
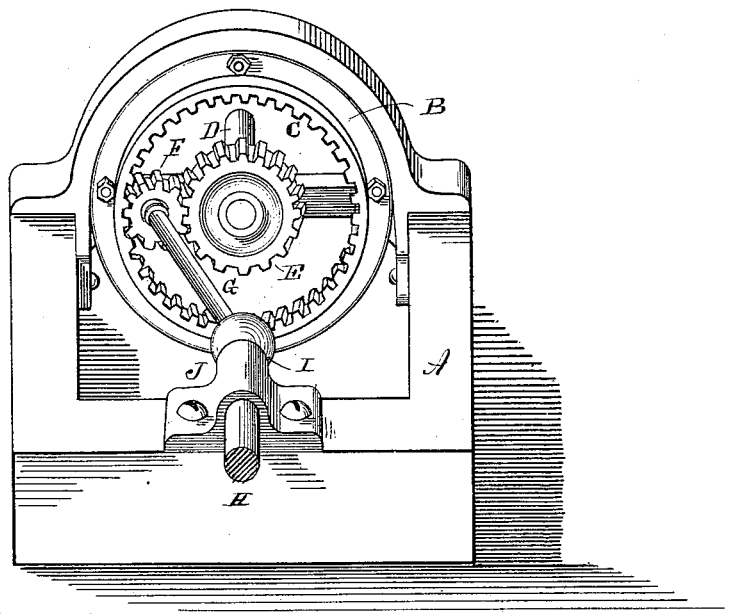
WITNESSES:
D. D. Mott
C. Sedgwick
INVENTOR:
A. C. Arneson
BY Munn & Co.
ATTORNEYS.

UNITED STATES PATENT OFFICE.

AUGUST C. ARNESON, OF CLARK'S GROVE, MINNESOTA.

MECHANICAL MOVEMENT.

SPECIFICATION forming part of Letters Patent No. 360,194, dated March 29, 1887.

Application filed June 23, 1886. Serial No. 206,000. (No model.)

*To all whom it may concern:*

Be it known that I, AUGUST C. ARNESON, of Clark's Grove, in the county of Freeborn and State of Minnesota, have invented a new and Improved Mechanical Movement, of which the following is a specification, reference being had to the annexed drawings, forming a part thereof, in which—

Figure 1 is a plan view, partly in section, of my improved mechanical movement. Fig. 2 is a perspective view.

Similar letters of reference indicate corresponding parts in both figures of the drawings.

The object of my invention is to provide a simple and effective movement to be inserted in a tumbling-rod or line-shaft, to increase the leverage on the driven shaft without loss of speed or power applied to the driving-shaft.

My invention consists in an annular internal gear supported on a suitable frame, and a shaft journaled axially with reference to the annular gear and provided with a gear-wheel, between which and the annular gear is placed a traveling pinion on a tumbling-rod connected with the driving-shaft by means of a universal joint.

It also consists in providing the gear-wheels with rolling surfaces opposite their pitch line, so that the traveling pinion will be guided without meshing too deeply into the internal or external gear.

Upon the frame A is mounted the ring B, having series of beveled teeth C around its inner surface. In journal-boxes a, supported by the frame A, is journaled the driven shaft D, provided at the end projecting into the ring B with a beveled toothed wheel, E. Between the wheel E and the ring B is placed a pinion, F, which is secured to a tumbling-rod, G, the tumbling-rod being connected with the driving-shaft H by a universal joint, I, of ordinary construction. The shaft H is journaled in boxes J on the frame A, axially in line with the driven shaft D. The internally-toothed ring B, the pinion F, and the driven wheel E are each provided with rolling surfaces $b$ opposite the pitch lines of the teeth. The rolling surfaces of the wheel E and ring B contact with the rolling surfaces of the pinion F, so that the pinion is always held in proper relation to the toothed ring and the wheel E.

When power is applied to the shaft H, the tumbling-rod G is rotated, and the pinion F travels around the inner surface of the ring B, at the same time revolving the wheel E with a velocity due to the relative sizes of the pinion F and the wheel E, and also to the additional revolution of the pinion F around the axis of the wheel E, if pinion E has twice the teeth of pinion F, causing one revolution of the wheel E and shaft D when the shaft H and tumbling-rod G and pinion F make one revolution. The proportions of the wheel, pinion, and toothed ring may be varied to suit the mechanical movement to the different circumstances under which it may be used.

When it is desired to cause the driven shaft to rotate in the same direction as the driving-shaft, a pair of spur-wheels will be applied to either the driving or driven shaft; or two of the mechanical movements may be oppositely arranged with respect to each other and connected together.

Having thus described my invention, what I claim as new, and desire to secure by Letters Patent, is—

1. In a mechanical movement, the combination, with a ring having internal and beveled teeth, of a beveled toothed wheel in the said ring, a tumbling-rod, and a pinion on the end of the tumbling-rod engaging the said ring and toothed wheel, substantially as herein shown and described.

2. In a mechanical movement, the combination of the internally-toothed ring B, the spur-wheel E, the pinion F, and the tumbling-rod G, the toothed ring B, the wheel E and pinion F being provided with rolling contact-surfaces $b$, substantially as shown and described.

AUGUST C. ARNESON.

Witnesses:
W. A. HIGGINS,
C. O. BARNESS.